Jan. 25, 1966  F. W. MURPHY ET AL  3,231,698
VISIBLE LIQUID LEVEL SWITCH GAUGE
Filed May 11, 1964  2 Sheets-Sheet 1

INVENTOR.
FRANK W. MURPHY
BY FRANK W. MURPHY, JR.
Kimmel & Crowell
ATTORNEYS.

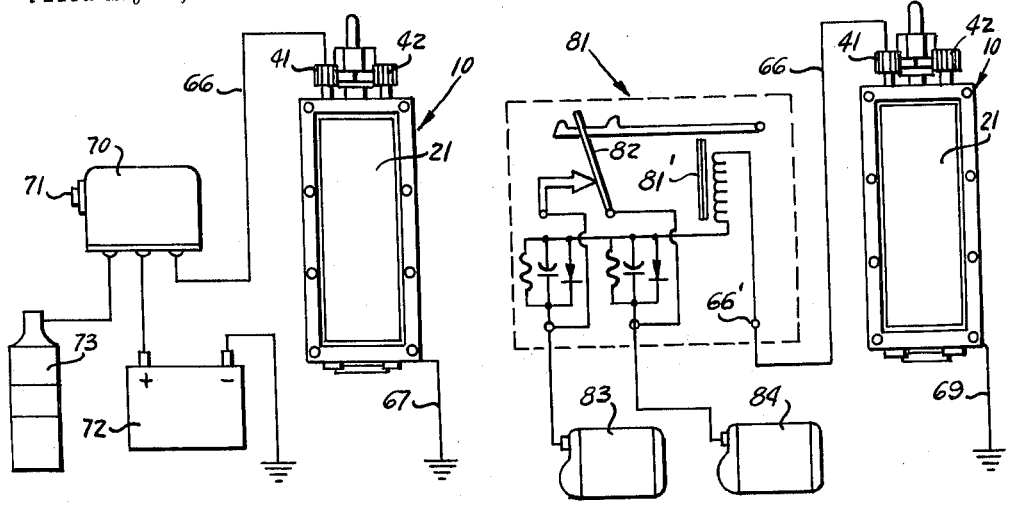
Fig. 6
Fig. 7
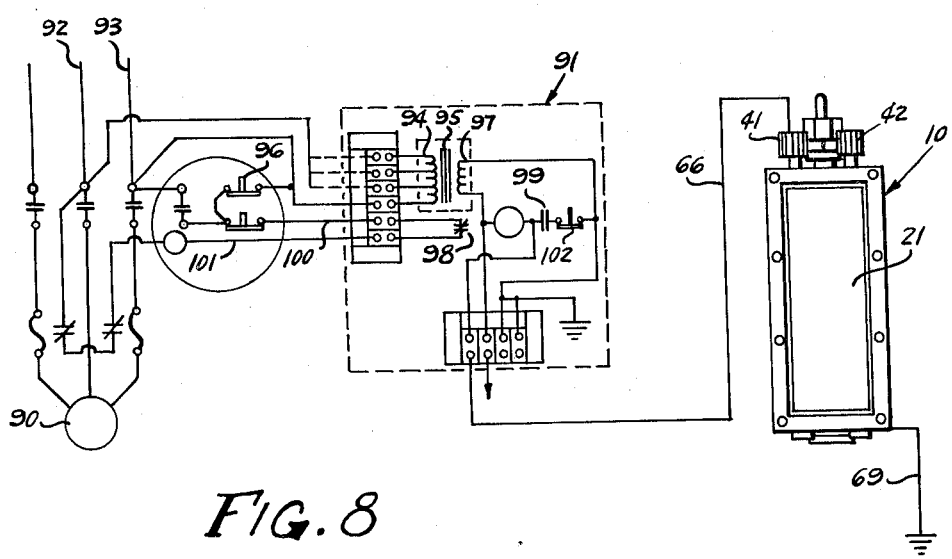
Fig. 8

United States Patent Office 3,231,698
Patented Jan. 25, 1966

3,231,698
VISIBLE LIQUID LEVEL SWITCH GAUGE
Frank W. Murphy and Frank W. Murphy, Jr., both of
P.O. Box 4537, Tulsa, Okla.
Filed May 11, 1964, Ser. No. 366,239
3 Claims. (Cl. 200—84)

This invention relates to a visible liquid level switch gauge and has as its primary object the provision of such a device whereby the level of a selected liquid may be readily visually determined, characterized by variable upper and lower limit contacts, which when engaged by a float, will ground out an electrical circuit to stop an internal combustion engine, a pump, an electric motor, or the like, or alternatively, to actuate a signal, indicator, alarm, or similar device in accordance with the installation in which it is used.

A further object of the invention is the provision of such a switch gauge which will actuate any "one wire to ground" shut down or alarm system immediately upon the achievement of a predetermined high or low liquid level.

A further and more specific object of the invention is the provision of such a device wherein the selected high and low level limits may be readily varied over a relatively wide range.

A still further object of the invention is the provision of a device of this character which is sturdy and durable in construction, reliable and efficient in operation, and relatively simple and inexpensive to manufacture, install, and utilize.

Still other objects reside in the combinations of elements, arrangements of parts, and features of construction all as will be more fully pointed out hereinafter and disclosed in the accompanying drawings wherein there is shown a preferred embodiment of the instant inventive concept and illustrative embodiments of its several uses.

In the drawing:

FIGURE 1 is a front elevational view of a switch gauge constructed in accordance with the instant invention.

FIGURE 2 is a side elevational view thereof.

FIGURE 6 is a diagrammatic view of the device of the instant invention with a magnetic ignition switch or circuit breaker connected to open the circuit to the ignition coil on distributor ignition engines, or alternatively, the solenoid fuel valve on diesel engines upon the achievement of a predetermined high or low liquid level.

FIGURE 7 is a view similar to FIGURE 6 showing the device of the instant invention in association with a dual magneto ignition or multiple engine shut down switch.

FIGURE 8 is a similar diagrammatic view showing the device of the instant invention in association with a transformer relay assembly for shutting down an electrical motor.

Similar reference characters refer to similar parts throughout the several views of the drawing.

Figure 3:
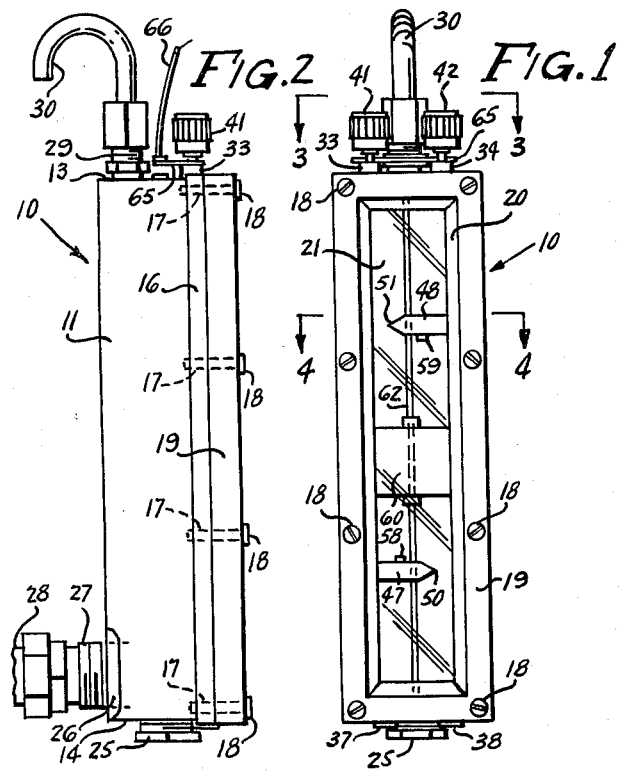
FIGURE 3 is an enlarged sectional view taken substantially along the line 3—3 of FIGURE 1 as viewed in the direction indicated by the arrows.
Figure 4:
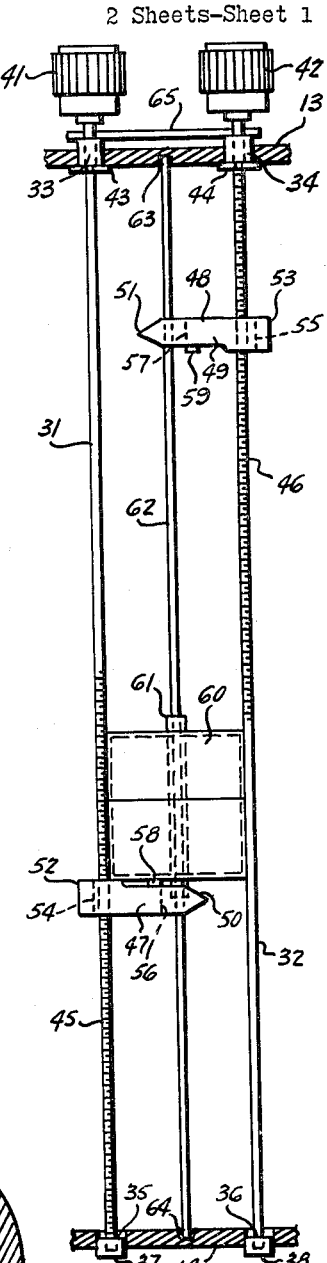
FIGURE 4 is an enlarged sectional view taken substantially along the line 4—4 of FIGURE 1 as viewed in the direction indicated by the arrows.

Having reference now to the drawings in detail, there is generally indicated at 10 a switch gauge constructed in accordance with the instant invention, which comprises a casing 11, preferably of aluminum, although other suitable metal may be used, which includes a substantially semi-circular body portion 12 including integral top and bottom plates 13 and 14, and an open front 15 which is flanked by two aligned flat shoulders 16. The shoulders 16 are provided with spaced threaded apertures 17 for the reception of screws 18 which extend through suitable openings in a substantially rectangular frame 19, having a central opening surrounded by a bevel 20 within which is positioned a transparent tempered glass plate 21. Suitable sealing gaskets 22 and 23 are provided between the shoulders 16 and the glass and the beveled flange 20 and the glass respectively, the entire assembly being substantially fluid tight when in closed position and secured by the screws 18. Bottom wall 14 is provided with a suitable opening which is threaded to receive a drainage plug 25, while a threaded fitting 26 extending rearwardly from the bottom of the arcuate rear wall 12 is adapted to receive a connection 27 to a line 28 extending to a liquid containing receptacle, the level of which is to be gauged.

The top plate 13 is also provided with an opening which contains a threaded fitting 29 to which is secured a reverted vent pipe 30 so that the interior of the casing is subject to atmospheric pressure and open to the air.

Oppositely disposed electrically conductive rod 31 and 32 extend through suitable insulating bushings 33 and 34 in the top wall 13 of the casing, the bushings being force fitted in suitable openings, into sockets 35 and 36 extending partially through similar insulating bushings 37 and 38 force fitted into openings in the bottom wall 14 of the casing. Each of rods 31 and 32 is provided with a knurled operating knob 41 and 42, respectively with a knurled operating knob 41 and 42, respectively exteriorly of the top wall 13 so that either or both of the rods may be rotated at will. Split washers 43 and 44 or similar devices may be positioned on each of rods 31 and 32, respectively, below the lower wall 13, prior to installation of the front frame 19, in order to prevent linear movement of the rods.

The lower portion of rod 31 is threaded as at 45 while the upper portion of rod 32 is similarly threaded as at 46, and each rod has mounted thereon a pointer 47 and 48, respectively. Each pointer includes a flat front surface 48 and 49, respectively, having a pointer tip 50 and 51, respectively, which contacts in the rear of glass panel 21, an outwardly protruding shoulder 52 and 53, respectively, which extends beyond the associated rod in a direction opposite the point at end, precludes rotation of the pointers or movement in any direction except vertically when the rods are rotated by means of the knobs 41 and 42. Each pointer includes a rearwardly extending protuberance 54 and 55, respectively, through which extends a threaded bore engageable by the threads of the respective rods. Relatively flat horizontal contact plates 56 and 57 extend inwardly of the casing from the pointers, and are provided respectively with an upwardly extending contact lug 58 and a downwardly extending contact lug 59.

The lugs 58 and 59 extend inwardly into the casing into the path of travel of a cylindrical float 60 of suitable electrically conductive material which is provided with a centrally positioned axial conductive tube 61. The tube 61 surrounds a centered brass rod 62 which is grounded at its opposite end 63 and 64 in the metallic cover plates 13 and 14. The rod and float are so positioned that the float will upon upward or downward movement contact either nickel brass contact member 59 or its opposed member 58, to close a circuit through the float 60, tube 61, rod 62 in casing 11 to ground, while at no time is the float permitted to contact the side walls of the casing so as to preclude accidental grounding.

A suitable terminal plate 65 in electrical association with both rods 31 and 32 is seated on the projecting tops of insulating bushings 33 and 34 and has connected thereto a single wire 66 which extends to suitable electrical apparatus to be grounded, as will be more fully described hereinafter. The arrangement is obviously such that the contacts 50 and 51 are readily visible through the transparent front panel 21 even though the contents of the switch gauge may be relatively cloudy or murky, and that their relative height, and the consequent desired active high or low level limit of the liquid may be readily adjusted merely by rotating knobs 41 and 42. Obviously, when the liquid reaches a predetermined high level, the circuit carried by wire 66 is grounded out through rod 32 and contact lug 59, while when the liquid level reaches a predetermined low point, the circuit may be grounded out through rod 31 and contact 58.

Figure 5:
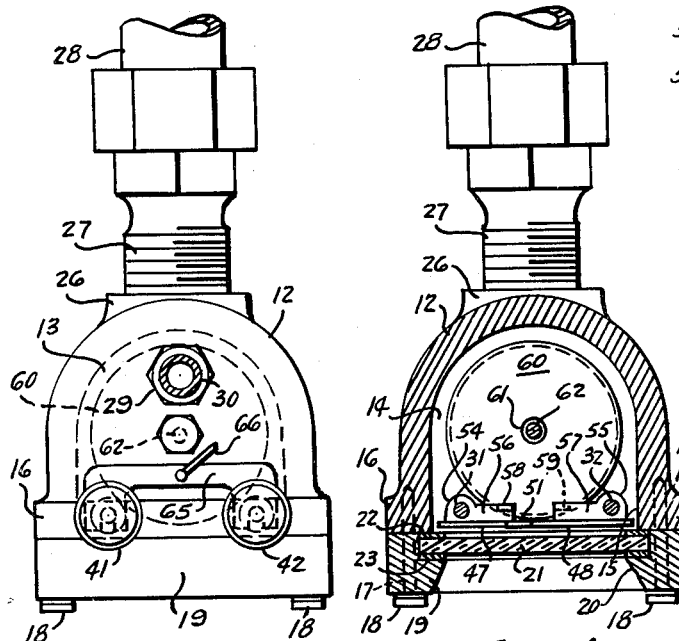
FIGURE 5 is an enlarged plan view, partially in elevation, and partially in section, showing the operating mechanism of the device removed from its associated casing.

One form of application of the switch gauge of the instant invention is disclosed in FIGURE 5 wherein the device 10 is suitably grounded as at 69 by mounting on the engine, or in any other desired manner, and the wire 66 extends to the terminal S of a magnetic snap switch 70 which is provided with a resetting button 71. Such a switch is manufactured by Frank W. Murphy Manufacturer, Inc. of Tulsa, Oklahoma, as type No. 117 and is fully disclosed in Patent No. 2,992,303 issued to Frank W. Murphy on July 11, 1961. Grounding of a circuit through wire 66 in the manner previously described breaks a circuit between the battery 72 and the ignition coil 73, or alternatively, the solenoid fuel valve on a diesel engine, and renders the engine inoperative.

A further modification is shown in FIGURE 6 wherein the switch gauge device 10 is grounded as at 69, and the wire 66 extends to a dual magneto ignition or multiple engine shut down switch generally indicated at 80 which is also manufactured by Frank W. Murphy Manufacturer, Inc. under the No. 202-N as indicated switch 80 contains a solenoid coil 81 which is normally de-energized until grounded by the operation of switch gauge 10. Energization of the coil opens a switch contact 82 to shut off an engine or similar device regardless of which engine or magneto 83 or 84 is operating.

FIGURE 8 discloses the device acting as a liquid high or low level shut off for an electric motor 90, to which it is connected through a transformer relay 91, the latter assembly also being manufactured by the Frank W. Murphy Manufacturer, Inc. under the No. TR7207. In this form of apparatus current is supplied from the lines 92 and 93 of the motor to the high side 94 of transformer 95 regardless of whether or not push button switch 96 is open or closed. Thus, energy is constantly available for the low side 97 of the transformer which powers a relay R-1 when the circuit is closed through ground 69.

Closure of the circuit opens the switches 98 and 99 to break the circuit to the motors through wires 100 and 101 thus automatically shutting the same down, the switches remaining open until the relay is de-energized by reset button 102.

The above are illustrative only of the numerous uses to which the switch gauge of the instant invention may be put, and numerous other applications will readily occur to those skilled in the art.

While the devices herein have been described in its simplest form, it will be understood that, if desired, microswitches may be substituted for the contact arms 58 and 59 to actuate, for example, single pole double throw switches to actuate a stop mechanism and an alarm or to operate solenoid valve to control oil addition as needed, or any other purpose normally commensurate with the use of such a switch gauge.

It will also be understood that while the instant invention has been primarily described for use with a one wire to ground circuit, it can be readily adapted to use with other circuitry for similar control purposes.

It will also be obvious that the device may be made in any desired size, and that a clear view of the liquid level indicating float will be afforded at all times, as well as the level of the high and low limits therein and that by threading the adjustment rods to a greater or less extent the range of variation of either the high or low level limit may be increased or decreased as desired.

From the foregoing it will now be seen that there is herein provided an improved visible liquid level switch gauge which accomplishes all the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

We claim:

1. A liquid level switch gauge comprising a casing of electrically conductive material including top and bottom plates and an open front, a transparent panel sealingly closing said open front, an electrically conductive rod extending vertically centrally of said casing between said top and bottom plates electrically connected therewith, an electrically conductive float mounted for vertical linear movement on said rod in constant electrical contact therewith, a pair of conductive rods on opposite sides of said first-mentioned rod, an upper contact and a lower contact each carried by one of said rods and electrically connected therewith, an electrical circuit connected to said pair of rods, said circuit being adapted to be closed by grounding, said contacts extending into the vertical path of travel of said float, contact of said float with either said upper or said lower contact thus grounding said circuit to energize or de-energize electrical apparatus connected thereto, means for introducing fluid, the level of which is to be measured, into said casing, means to vary the relative vertical position of each contact, said pair of rods being threaded, and extending through threaded bores in said contacts, and said last-mentioned means comprising means positioned externally of said casing for rotating said rods.

2. The structure of claim 1 wherein said contacts include flat facial portions in contact with said transparent panel each extending on either side of its associated rod, whereby rotative movement of said contacts is precluded.

3. The structure of claim 2 wherein said casing is vented to the atmosphere.

References Cited by the Examiner
UNITED STATES PATENTS 666,451   1/1901   Zimmermann _____ 200—84
2,260,312  10/1941  Gruman _____ 200—84 X BERNARD A. GILHEANY, *Primary Examiner.*

H. A. LEWITTER, *Assistant Examiner.*